(12) United States Patent
Ge et al.

(10) Patent No.: US 11,815,658 B2
(45) Date of Patent: Nov. 14, 2023

(54) TRANSPARENT FILMS BASED ON RESIN COMPONENTS HAVING A HIGH GLASS TRANSITION TEMPERATURE

(71) Applicant: TRINSEO EUROPE GMBH, Horgen (CH)

(72) Inventors: Jiaxin Jason Ge, Lower Providence, PA (US); Florence Mehlmann, Berwyn, PA (US); Estelle Meurice Pierrat, Corneville-sur-Risle (FR)

(73) Assignee: Trinseo Europe GmbH, Pfaeffikon (CH)

( * ) Notice: Subject to any disclaimer, the term of this patent is extended or adjusted under 35 U.S.C. 154(b) by 58 days.

(21) Appl. No.: 16/484,835

(22) PCT Filed: Feb. 20, 2018

(86) PCT No.: PCT/US2018/018795
§ 371 (c)(1),
(2) Date: Aug. 9, 2019

(87) PCT Pub. No.: WO2018/152522
PCT Pub. Date: Aug. 23, 2018

(65) Prior Publication Data
US 2019/0367720 A1    Dec. 5, 2019

Related U.S. Application Data

(60) Provisional application No. 62/461,007, filed on Feb. 20, 2017.

(51) Int. Cl.
| | |
|---|---|
| *G02B 1/14* | (2015.01) |
| *B29C 55/12* | (2006.01) |
| *C08F 212/08* | (2006.01) |
| *C08F 220/06* | (2006.01) |
| *C08F 220/08* | (2006.01) |
| *C08K 5/00* | (2006.01) |
| *C08K 5/3492* | (2006.01) |
| *C08K 5/49* | (2006.01) |
| *C08L 25/06* | (2006.01) |
| *C08L 33/06* | (2006.01) |
| *C08L 33/12* | (2006.01) |
| *C08F 220/18* | (2006.01) |

(52) U.S. Cl.
CPC ............... *G02B 1/14* (2015.01); *B29C 55/12* (2013.01); *C08F 212/08* (2013.01); *C08F 220/06* (2013.01); *C08F 220/08* (2013.01); *C08K 5/005* (2013.01); *C08K 5/3492* (2013.01); *C08K 5/49* (2013.01); *C08L 25/06* (2013.01); *C08L 33/064* (2013.01); *C08L 33/12* (2013.01); *C08F 220/1802* (2020.02); *C08F 2500/12* (2013.01); *C08L 2201/10* (2013.01); *C08L 2203/16* (2013.01); *C08L 2203/20* (2013.01); *C08L 2205/025* (2013.01)

(58) Field of Classification Search
CPC ............................ C08L 2205/025; C08L 33/12
See application file for complete search history.

(56) References Cited

U.S. PATENT DOCUMENTS

| | | | | | |
|---|---|---|---|---|---|
| 4,789,709 | A | * | 12/1988 | Kato | .......................... C08F 8/48 |
| | | | | | 525/330.2 |
| 4,965,321 | A | * | 10/1990 | Yuyama | ..................... C08F 8/48 |
| | | | | | 525/329.7 |
| 7,348,387 | B2 | * | 3/2008 | Matsumoto | .............. G02B 1/04 |
| | | | | | 526/266 |
| 7,462,671 | B2 | | 12/2008 | Matsumoto et al. | |
| 8,399,567 | B2 | | 3/2013 | Chun et al. | |
| 9,429,682 | B2 | | 8/2016 | Choi et al. | |
| 10,550,234 | B2 | | 2/2020 | Maeda et al. | |
| 2006/0100391 | A1 | | 5/2006 | Matsumoto et al. | |
| 2007/0009752 | A1 | * | 1/2007 | Lefebvre | ................. B32B 27/06 |
| | | | | | 428/500 |
| 2011/0226313 | A1 | | 9/2011 | Lefebvre et al. | |
| 2012/0164364 | A1 | | 6/2012 | Mehlmann | |
| 2014/0000801 | A1 | | 1/2014 | Seo et al. | |
| 2014/0342162 | A1 | | 11/2014 | Sanefuji et al. | |
| 2015/0103513 | A1 | * | 4/2015 | Ge | ....................... C09D 133/12 |
| | | | | | 362/97.3 |
| 2015/0299449 | A1 | * | 10/2015 | Ozawa | ................. G02B 6/0066 |
| | | | | | 362/611 |

FOREIGN PATENT DOCUMENTS

| | | | | |
|---|---|---|---|---|
| CN | 102272640 | A | | 12/2011 |
| GB | 1437176 | A | * | 5/1976 ............... C08F 8/48 |
| JP | 2004292812 | A | | 10/2004 |
| KR | 20120116840 | A | | 10/2012 |
| KR | 20160090793 | A | | 8/2016 |

OTHER PUBLICATIONS

Fox Equation Screen Shot. Evidentiary Reference. Available at http://www.wernerblank.com/equat/Fox_equation15.htm (Year: 2021).*
European Communication Pursuant to Rules 70(2) and 70a(2) for European Application No. 18754166.9, dated Dec. 15, 2020, 1 page.
Extended European Search Report for European Application No. 18754166.9, dated Nov. 25, 2020, 7 pages.
Chinese Office Action for Chinese Application No. 201880024372.4, dated Oct. 11, 2021 with translation, 17 pages.
Japanese Notice of Reason for Refusal for Japanese Application No. 2019-544917, dated Jan. 25, 2022, with translation, 10 pages.
European Communication Pursuant to Article 94(3) for European Application No. 18754166.9, dated Apr. 21, 2022, 6 pages.
Chinese Office Action for Chinese Application No. 201880024372.4, dated Apr. 12, 2022 with translation, 11 pages.

(Continued)

*Primary Examiner* — Michael M Dollinger
(74) *Attorney, Agent, or Firm* — RatnerPrestia

(57) ABSTRACT

Films having high light transmission values, low haze and high glass transition temperatures and useful, for example, as optical protection films and zero-zero optical retardation films, are prepared using one or more copolymers of methyl methacrylate having certain characteristics.

21 Claims, No Drawings

(56) References Cited

OTHER PUBLICATIONS

Korean Notice of Preliminary Rejection for Korean Application No. 10-2019-7027494, dated Jun. 28, 2022, with translation, 19 pages.
Japanese Notice of Reasons for Refusal for Japanese Application No. 2019-544917, dated Jul. 19, 2022, with translation, 4 pages.
Chinese Decision on Rejection for Chinese Application No. 201880024372.4, dated Aug. 29, 2022 with translation, 7 pages.

* cited by examiner

TRANSPARENT FILMS BASED ON RESIN COMPONENTS HAVING A HIGH GLASS TRANSITION TEMPERATURE

This application claims benefit, under U.S.C. § 119 or § 365 of PCT Application Number PCT/US2018/018795, filed Feb. 20, 2018; and U.S. Provisional Application No. 62/461,007, filed Feb. 20, 2017; said applications incorporated herein by reference.

FIELD OF THE INVENTION

The invention pertains to films, based on one or more copolymers of methyl methacrylate, which are heat resistant and highly transparent with low levels of haze.

DISCUSSION OF THE RELATED ART

Conventionally, tri-acetate cellulose (TAC) films have been used in laminates containing I2 stained PVA (polyvinyl alcohol) absorption polarizers. However, it is challenging to fabricate optical polarizers containing TAC/PVA-I$_2$/TAC laminated films that meet the requirements needed under high temperature and high humidity conditions (e.g., 85° C., 85% relative humidity) or for thinner optical polarizers. Additionally, TAC films possess higher intrinsic effective negative optical retardation along the thickness and off-angle directions, which renders such films unsuitable for in-plane switching (IPS) and fringe field switching (FFS) liquid crystal display (LCD) applications.

Accordingly, there is a need for improved films having extremely low birefringence properties which are capable of being used as optical protection films and zero-zero retardation films in optical polarizers for organic light emitting diode (OLED) and IPS LCD devices such as smartphones, tablets, notebooks and LCD televisions with LED lighting units.

SUMMARY OF THE INVENTION

Acrylic films based on methyl methacrylate-containing copolymers have now been developed which are particularly well suited for use as optical protection films and near zero-zero retardation films in view of their high light transmission, low haze, high glass transition temperatures, low moisture uptake, mechanical strength, high dimensional stability and low in-plane and out-of-plane retardation. Certain embodiments of such films, prepared from resin components containing small amounts of methacrylic acid monomer units and anhydride units, are particularly suitable for thin optical polarizers for use in IPS and FFS LCD devices.

Various non-limiting aspects of the present invention may be summarized as follows:

Aspect 1: A film, wherein the film comprises a resin component having a Tg of at least about 115° C. and a weight average molecular weight of at least about 60,000 g/mole, the resin component comprising a) at least one copolymer of methyl methacrylate, methacrylic acid and, optionally, at least one additional co-monomer, and, optionally, b) at least one additional polymer selected from the group consisting of copolymers of methyl methacrylate and one or more C1-C4 alkyl esters of acrylic acid and, optionally, at least one additional co-monomer, wherein the film has a light transmission of at least about 90% and less than about 1% haze and wherein when the weight average molecular weight of the resin component is less than about 90,000 g/mole the resin component additionally comprises at least one antioxidant selected from the group consisting of phosphite antioxidants, phosphate antioxidants, phosphonate antioxidants, phosphine antioxidants, phenolic antioxidants, triazinetrione antioxidants and combinations thereof.

Aspect 2: The film of Aspect 1, wherein the at least one additional polymer is present in the resin component.

Aspect 3: The film of Aspect 2, wherein the at least one additional polymer is a copolymer of methyl methacrylate and at least one co-monomer selected from ethyl acrylate or methyl acrylate.

Aspect 4: The film of any of Aspects 1-3, wherein the resin component is comprised of from about 25% by weight to 100% by weight of a) and from 0% to about 75% by weight of b), wherein the total weight of a) and b) is 100%.

Aspect 5: The film of any of Aspects 2-4, wherein the at least one additional polymer has a weight average molecular weight of at least 100,000 g/mole.

Aspect 6: The film of any of Aspects 2-5, wherein the at least one additional polymer has a weight average molecular weight of at least 120,000 g/mole.

Aspect 7: The film of any of Aspects 1-6, wherein at least one additional co-monomer is present in the copolymer and the at least one additional co-monomer is selected from the group consisting of ethyl acrylate, methyl acrylate, styrene, alpha-methyl styrene, maleic anhydride, benzyl methacrylate, cyclohexyl methacrylate, tert-butyl cyclohexyl methacrylate, tert-butyl methacrylate and combinations thereof.

Aspect 8: The film of any of Aspects 1-7, wherein the at least one copolymer is selected from the group consisting of methyl methacrylate/methacrylic acid copolymers, methyl methacrylate/methacrylic acid/ethyl acrylate copolymers, methyl methacrylate/methacrylic acid/methyl acrylate copolymers, methyl methacrylate/methacrylic acid/styrene copolymers, methyl methacrylate/methacrylic acid/styrene/maleic anhydride copolymers, methyl methacrylate/methacrylic acid/maleic anhydride/alpha-methyl styrene copolymers, methyl methacrylate/methacrylic acid/ethyl acrylate/benzyl methacrylate copolymers, methyl methacrylate/methacrylic acid/ethyl acrylate/cyclohexyl methacrylate copolymers, methyl methacrylate/methacrylic acid/ethyl acrylate/tert-butyl methacrylate copolymers and combinations thereof.

Aspect 9: The film of any of Aspects 1-8, wherein methacrylic acid comprises from about 1 to about 7 weight % of the copolymer.

Aspect 10: The film of any of Aspects 1-9, wherein methyl methacrylate comprises from about 80 to about 99 weight % of the copolymer.

Aspect 11: The film of any of Aspects 1-10, wherein the copolymer is comprised of about 79 to about 99% by weight methyl methacrylate, about 1 to about 7% by weight methacrylic acid and 0 to about 20% by weight in total of at least one additional co-monomer.

Aspect 12: The film of any of Aspects 1-11, wherein the Tg of the resin component is at least about 115° C.

Aspect 13: The film of any of Aspects 1-12, wherein the Tg of the resin component is not greater than about 135° C.

Aspect 14: The film of any of Aspects 1-13, wherein the film has been biaxially stretched.

Aspect 15: The film of Aspect 14, wherein the film has a thickness of about 10 to about 200 microns.

Aspect 16: The film of Aspect 14, wherein the film has a thickness of about 15 to about 80 microns.

Aspect 17: The film of any of Aspects 1-13, wherein the film has a thickness of about 60 to about 500 microns.

Aspect 18: The film of any of Aspects 1-17, wherein the film has an in-plane retardation value of less than about 10 nm at a wavelength of 560 nm and an out-of-plane retardation value of less than about 10 nm at a wavelength of 560 nm.

Aspect 19: The film of any of Aspects 1-18, wherein the weight average molecular weight of the resin component is at least about 100,000 g/mole.

Aspect 20: The film of any of Aspects 1-19, wherein the copolymer has a weight average molecular weight of at least about 70,000 g/mole.

Aspect 21: The film of any of Aspects 1-20, wherein the film has a light transmission of at least about 92% and less than 0.5% haze.

Aspect 22: The film of any of Aspects 1-21, wherein the resin component has a melt flow rate of about 0.5 to about 2.0 g/10 minutes at 230° C. under 3.8 kg.

Aspect 23: The film of any of Aspects 1-22, additionally comprising at least one antioxidant selected from the group consisting of phosphite antioxidants, phosphate antioxidants, phosphonate antioxidants, phosphine antioxidants, phenolic antioxidants, triazinetrione antioxidants and combinations thereof.

Aspect 24: The film of any of Aspects 1-23, additionally comprising at least one UV stabilizer selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof.

Aspect 25: The film of any of Aspects 1-24, additionally comprising at least one toughening agent.

Aspect 26: The film of any of Aspects 1-25, wherein anhydride ring structures are present in the resin component.

Aspect 27: The film of Aspect 26, wherein the resin component contains 0.5 to 2% by weight anhydride ring structures, as measured by $^{13}C$ NMR.

Aspect 28: A method of making the film of any of Aspects 1-27, comprising melt-extruding the resin component to form the film.

Aspect 29: The method of Aspect 28, comprising an additional step of bi-axially stretching the film.

Aspect 30: A laminate comprising at least one film in accordance with any of Aspects 1-27 and at least one substrate or film other than a film in accordance with any one of Aspects 1-27.

Aspect 31: A liquid crystal display (LCD) device comprising at least one film in accordance with any one of Aspects 1-27.

Aspect 32: An article comprising at least one film in accordance with any of Aspects 1 to 27, wherein the article is selected from the group consisting of reflective films, multilayer films, conspicuity films, mirrored films, lenticular films, identification cards, appliances, transportation vehicles, solar films, and dual brightness enhancement films.

DETAILED DESCRIPTION OF CERTAIN EMBODIMENTS OF THE INVENTION

As previously mentioned, the present invention provides a film comprising a resin component having a Tg of at least about 115° C. (in other embodiments, a Tg of at least 115° C., at least 120° C., at least 125° C. or at least 130° C.; in certain embodiments, the Tg of the resin component is not greater than 140° C.) and a weight average molecular weight of at least about 60,000 g/mole (in other embodiments, a weight average molecular weight of at least 60,000 g/mole, at least 70,000 g/mole, at least 80,000 g/mole, at least 90,000 g/mole, at least 95,000 g/mole, or at least 100,000 g/mole). In other embodiments, the weight average molecular weight of the resin component is not more than 250,000 g/mole or not more than 200,000 g/mole. The resin component is comprised a) at least one copolymer of methyl methacrylate, methacrylic acid and, optionally, at least one additional co-monomer (hereafter referred to as the "copolymer of methyl methacrylate and methacrylic acid"), and, optionally, b) at least one additional polymer selected from the group consisting of copolymers of methyl methacrylate and one or more C1-C4 alkyl esters of acrylic acid, which may optionally contain one or more additional co-monomers other than methyl methacrylate and C1-C4 alkyl esters of acrylic acid (hereafter referred to as the "optional additional polymer" or the "additional polymer"). The film has a light transmission of at least about 90% and less than about 1% haze. In another embodiment, the film has a light transmission of at least about 92% and less than about 0.5% haze. When the weight average molecular weight of the resin component is less than about 90,000 g/mole, the resin component additionally comprises at least one antioxidant selected from the group consisting of phosphite antioxidants, phosphate antioxidants, phosphonate antioxidants, phosphine antioxidants, phenolic antioxidants, triazinetrione antioxidants and combinations thereof.

Analytical Test Methods

The test methods used to measure parameters and characteristics of the components of the resin component and of the films in accordance with the present invention, such as glass transition temperature (Tg), weight average molecular weight, % light transmission and % haze, are set forth in the Examples.

Copolymer(s) of Methyl Methacrylate and Methacrylic Acid

As previously mentioned, the films of the present invention are characterized by being comprised of a resin component comprised of at least one copolymer of methyl methacrylate, methacrylic acid and, optionally, at least one additional co-monomer (the "copolymer of methyl methacrylate and methacrylic acid"). In a preferred embodiment of the invention, the copolymer of methyl methacrylate and methacrylic acid is a random (statistical) copolymer. In another preferred embodiment, the copolymer of methyl methacrylate and methacrylic acid is a linear (non-branched) copolymer.

The at least one copolymer of methyl methacrylate and methacrylic acid may, for example, be advantageously selected from the group consisting of methyl methacrylate/methacrylic acid copolymers, methyl methacrylate/methacrylic acid/ethyl acrylate copolymers, methyl methacrylate/methacrylic acid/tert-butyl cyclohexyl methacrylate copolymers, methyl methacrylate/methacrylic acid/styrene copolymers, methyl methacrylate/methacrylic acid/styrene/maleic anhydride copolymers, methyl methacrylate/methacrylic acid/maleic anhydride/alpha-methyl styrene copolymers, methyl methacrylate/methacrylic acid/ethyl acrylate/benzyl methacrylate copolymers, methyl methacrylate/methacrylic acid/ethyl acrylate/cyclohexyl methacrylate copolymers, methyl methacrylate/methacrylic acid/ethyl acrylate/tert-butyl cyclohexyl methacrylate copolymers and combinations thereof.

Methacrylic acid may, in certain embodiments, comprise (in polymerized form) at least about 0.5 weight % of the copolymer and/or not more than about 10 weight % of the copolymer, e.g., from about 1 to about 7 weight % of the copolymer. According to other embodiments, methyl methacrylate may comprise at least about 50 weight % and/or not more than about 99.5 weight %, e.g., from about 70 to about 99 weight % or from about 80 to about 99 weight %, of the copolymer. The copolymer may, in various embodiments of the invention, be comprised of about 79 to about 99% by weight methyl methacrylate, about 1 to about 7% by weight methacrylic acid and 0 to about 20% by weight in total of at least one additional co-monomer.

The optional additional co-monomer or co-monomers used to make the copolymer may be any co-monomer or co-monomers capable of being copolymerized with the methyl methacrylate and methacrylic acid, but in preferred embodiments is or are a vinyl aromatic monomer and/or a (meth)acrylate monomer, such as (but not limited to) methyl acrylate, ethyl acrylate, styrene, cyclic and aliphatic unsaturated anhydrides (such as maleic anhydride), alpha-methyl styrene, cyclohexyl methacrylate, tert-butyl cyclohexyl methacrylate tert-butyl methacrylate and combinations thereof. Acrylic acid and other alpha-beta unsaturated carboxylic acid monomers may also be employed.

Particular illustrative examples of acid-functionalized acrylic copolymers in accordance with the present invention include the following copolymers:

A copolymer consisting of methyl methacrylate (92 to 98.5 weight %) and methacrylic acid (1.5 to 8 weight %).

A copolymer consisting of methyl methacrylate (70 to 80 weight %), methacrylic acid (1 to 3 weight %), alpha-methylstyrene (20 to 25 weight %) and n-butyl acrylate (0.5 to 2 weight %).

A copolymer consisting of methyl methacrylate (94 to 98 weight %, e.g., 96 weight %), methacrylic acid (1.5 to 4.5 weight %, e.g., 3 weight %) and ethyl acrylate (0.5 to 2 weight %, e.g., 1 weight %).

A copolymer consisting of methyl methacrylate (84 to 94 weight %), methacrylic acid (2 to 6 weight %) and styrene (2 to 10 weight %).

A copolymer consisting of methyl methacrylate (92 to 96 weight %, e.g., 94 weight %), methacrylic acid (2 to 4 weight %, e.g., 3 weight %), styrene (1 to 3 weight %) and, optionally, alpha-methylstyrene (0 to 2 weight %).

A copolymer consisting of methyl methacrylate (92 to 96 weight %, e.g., 94 weight %), methacrylic acid (2 to 4 weight %, e.g., 3 weight %), optionally, ethyl acrylate (0 to 2 weight %) and, optionally, benzyl methacrylate (0 to 4 weight %).

A copolymer consisting of methyl methacrylate (92 to 96 weight %, e.g., 94 weight %), methacrylic acid (2 to 4 weight %, e.g., 3 weight %), optionally, ethyl acrylate (0 to 2 weight %) and, optionally, tert-cyclohexyl methacrylate (0 to 5 weight %).

A copolymer consisting of methyl methacrylate (92 to 96 weight %, e.g., 94 weight %), methacrylic acid (2 to 4 weight %, e.g., 3 weight %), optionally, ethyl acrylate (0 to 2 weight %) and, optionally, tert-butyl methacrylate (0 to 5 weight %).

Adaptations of any copolymerization methods known in the art may be suitably used to prepare the copolymers. The copolymers can be obtained, for example, through bulk polymerization, melt polymerization, solution polymerization, emulsion polymerization, and even suspension polymerization. For example, in a bulk copolymerization, a monomer mixture containing methyl methacrylate, methacrylic acid and any other comonomers desired to be incorporated as part of the target acid-functionalized acrylic copolymer may be charged to a suitable polymerization vessel and polymerization initiated using a suitable initiator or combination of initiators, such as a free radical initiator (e.g., a peroxide compound). One or more chain transfer agents, such as a mercaptan and/or disulfide, may additionally be present. The polymerization reaction mixture is then heated for a time and at a temperature effective to accomplish the desired degree of conversion, with any unreacted monomer(s) then being removed from the copolymer product by any suitable means such as volatilization.

The copolymer obtained may be compounded with one or more other components (e.g., additional polymer, toughening agent (e.g., block copolymer toughening agent, core-shell toughening agent), UV stabilizer and/or antioxidant) to obtain the resin component, using any suitable method such as extrusion.

Optional Additional Polymer(s)

As previously mentioned, in certain embodiments of the invention at least one additional polymer is present in the resin component. The additional polymer may be selected from the group consisting of copolymers of methyl methacrylate and one or more C1-C4 alkyl esters of acrylic acid. Examples of suitable C1-C4 alkyl esters include methyl acrylate, ethyl acrylate, n-propyl acrylate, isopropyl acrylate, n-butyl acrylate, isobutyl acrylate, sec-butyl acrylate and tert-butyl acrylate and combinations thereof. Optionally, at least one additional monomer, other than methyl methacrylate and one or more C1-C4 alkyl esters of acrylic acid, may also be present, in polymerized form, in the copolymer. The additional polymer is different from the copolymer of methyl methacrylate and methacrylic acid in that it does not contain methacrylic acid. The optional additional co-monomer or co-monomers used to make the copolymer thus may be any co-monomer or co-monomers other than methacrylic acid which is or are capable of being copolymerized with the methyl methacrylate and C1-C4 alkyl ester(s) of acrylic acid, but in preferred embodiments is or are a vinyl aromatic monomer and/or a (meth)acrylate monomer (other than a C1-C4 alkyl ester), such as (but not limited to) styrene, cyclic and aliphatic unsaturated anhydrides (such as maleic anhydride), alpha-methyl styrene, cyclohexyl methacrylate, and combinations thereof. Acrylic acid and other alpha-beta unsaturated carboxylic acid monomers may also be employed.

In various embodiments of the invention, the additional polymer may consist essentially of or consist of polymerized units of methyl methacrylate and one or more C1-C4 alkyl esters of acrylic acid (C1-C4 alkyl acrylates). In a preferred embodiment of the invention, the additional polymer is a random (statistical) copolymer. In another preferred embodiment, the additional polymer is a linear (non-branched) copolymer.

For example, the at least one additional polymer may be a copolymer of methyl methacrylate and at least one co-monomer selected from ethyl acrylate or methyl acrylate.

In preferred embodiments of the invention, the at least one additional polymer may have a weight average molecular weight of at least 100,000 g/mole, at least 110,000 g/mole, at least 120,000 g/mole or at least 130,000 g/mole. In further embodiments, the weight average molecular weight of the at least one additional polymer is not greater than 250,000 g/mole or not greater than 200,000 g/mole.

Methods for making additional polymers suitable for use in the present invention are not limited; such methods may include adaptations of any of the polymerization techniques known in the art. For example, the copolymer can be obtained through melt polymerization, solution polymerization, or emulsion polymerization.

The additional polymer is not a required ingredient in the resin component used to make films in accordance with the present invention. Accordingly, in certain embodiments of the invention the resin component is comprised of from about 25% by weight to 100% by weight of the copolymer(s) of methyl methacrylate and methacrylic acid and from 0% to about 75% by weight of the additional polymer(s), wherein the total weight of a) and b) is 100%.

The polymer or polymers used in the resin component are, in a preferred embodiment, selected to provide a resin component having a melt flow rate of about 0.5 to about 2.0 g/10 minutes at 230° C. under 3.8 kg.

In certain embodiments of the invention, anhydride ring structures are present in the resin component. For example, the resin component may contain 0.5 to 2% by weight anhydride ring structures, as measured by $^{13}C$ NMR. Such anhydride ring structures may be incorporated into one or both of the copolymer of methyl methacrylate and methacrylic acid or the additional polymer by the use of one or more anhydride-containing co-monomers (particularly ethylenically unsaturated anhydrides such as maleic anhydride) during polymerization. Anhydride ring structures may also be incorporated post-polymerization by grafting or other polymer derivatization methods known in the art.

Antioxidants

The resin component used in the film may contain one or more antioxidants. When the weight average molecular weight of the resin component is less than 90,000 g/mole, at least one antioxidant in present in the resin component. Suitable antioxidants include antioxidants selected from the group consisting of phosphite antioxidants, phosphate antioxidants, phosphonate antioxidants, phosphine antioxidants, phenolic antioxidants (in particular, sterically hindered phenolic antioxidants), triazinetrione antioxidants and combinations thereof.

Examples of suitable sterically hindered phenolic antioxidants include, but are not limited to, pentaerythritol tetrakis (3-(3,5-di-tert-butyl-4-hydroxyphenyl)propionate) (sold by BASF under the product name Irganox® 1010) and triethylene glycol bis(3-tert-butyl-4-hydroxy-5-methylphenyl) propionate (sold by BASF under the product name Irganox® 245). Examples of suitable phosphite antioxidants include, but are not limited to, pentaerythritol diphosphites, such as those described in U.S. Pat. Nos. 5,364,895 and 5,438,086 (the disclosure of each of which is incorporated herein by reference in its entirety for all purposes), bis-(2,4-di-t-butylphenol) pentaerythritol diphosphite (sold by BASF under the product name Irgafos® 126), tris(2,4-di-tert-butylphenyl) phosphite (sold by BASF under the product name Irgafos® 168), and bis(2,4-dicumylphenyl) pentaerythritol diphosphate (sold by Dover Chemical Corporation under the product name DoverPhos® S-9228).

In various preferred embodiments of the invention, the resin component may contain at least 500 ppm antioxidant and/or not more than 5000 ppm antioxidant. For example, the resin component may comprise 1,500 to 3,000 ppm antioxidant in total.

Other Additives

The resin component may optionally comprise one or more additives in addition to the various ingredients mentioned above. Suitable types of additional optional additives include, but are not limited to, fillers, coloring agents, pigments, lubricants, processing aids, UV stabilizers, toughening agents, and antistatic agents, provided such additives are not present in amounts which interfere with the ability to obtain films having the desired transparency and clarity characteristics.

In one embodiment, the resin component additionally comprises at least one UV stabilizer. Suitable UV stabilizers may, for example, be selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof. In certain embodiments, the resin component is comprised of from about 1 weight % to about 5 weight % UV stabilizer.

In another embodiment, the resin component is additionally comprised of at least one toughening agent (sometimes also referred to as an impact modifier). The choice of toughening agent is not limited and may include block copolymer as well as core-shell toughening agents. Suitable block copolymer toughening agents include, for example, block copolymers selected from the group consisting of di-block and tri-block copolymers which contain a polyacrylate soft block and one or two polymethylmethacrylate and/or polystyrene hard blocks. Typically, such block copolymers may comprise from about 20 to about 40 weight % poly(butyl acrylate) blocks. Block copolymer toughening agents suitable for use in the present invention are available, for example, from Arkema under the brand name "Nanostrength".

Any of the various types of core-shell toughening agents known in the art may be employed. The core-shell toughening agent may be in the form of fine particles having an elastomer core and at least one thermoplastic shell, the particle size being generally less than 1 micron and advantageously between 150 and 500 nm, and preferably from 200 nm to 450 nm. The core-shell toughening agents typically are copolymers that may be monodisperse or polydisperse. By way of example of the core, mention may be made of isoprene homopolymers or butadiene homopolymers, copolymers of isoprene with at most 3 mol % of a vinyl monomer and copolymers of butadiene with at most 35 mol % of a vinyl monomer, and preferably 30 mol % or less. The vinyl monomer may be styrene, an alkylstyrene, acrylonitrile or an alkyl(meth)acrylate. Another core family consists of the homopolymers of an alkyl (meth)acrylate and the copolymers of an alkyl(meth)acrylate with at most 35 mol % of a vinyl monomer, and preferable 30 mol % or less. The alkyl(meth)acrylate is advantageously butyl acrylate. The vinyl monomer may be styrene, an alkylstyrene, acrylonitrile, butadiene or isoprene. The core of the copolymer may be completely or partly crosslinked. All that is required is to add at least difunctional monomers during the preparation of the core; these monomers may be chosen from poly(meth) acrylic esters of polyols, such as butylene di(meth)acrylate and trimethylolpropane trimethacrylate. Other difunctional monomers are, for example, divinylbenzene, trivinylbenzene, vinyl acrylate and vinyl methacrylate. The core can also be crosslinked by introducing into it, by grafting or as a comonomer during the polymerization, unsaturated functional monomers such as anhydrides of unsaturated carboxylic acids, unsaturated carboxylic acids and unsaturated epoxides. Mention may be made, by way of example, of maleic anhydride, (meth)acrylic acid and glycidyl methacrylate.

The shell(s) may be, for example, styrene homopolymers, alkylstyrene homopolymers or methyl methacrylate homopolymers, or copolymers comprising at least 70 mol % of one of the above monomers and at least one comonomer chosen from the other above monomers, vinyl acetate and acrylonitrile. The shell may be functionalized by introducing into it, by grafting or as a comonomer during the polymerization, unsaturated functional monomers such as anhydrides of unsaturated carboxylic acids, unsaturated carboxylic acids and unsaturated epoxides. Mention may be made, for example, of maleic anhydride, (meth)acrylic acid and glycidyl methacrylate. By way of example, mention may be made of core-shell copolymers (A) having a polystyrene shell and core-shell copolymers (A) having PMMA shell. The shell could also contain functional or hydrophilic groups to aid in dispersion and compatibility with different polymer phases. There are also core-shell copolymers (A) having two shells, one made of polystyrene and the other, on the outside, made of PMMA. Advantageously, the core represents, by weight, 70 to 90% of the core-shell polymer, and the shell represents 30 to 10%.

If a toughening agent is to be included in the resin component, it is preferably selected to be one that provides a resin component having high optical clarity, high impact resistance and/or high mechanical toughness/ductility. One or more toughening agents may be present in a total amount of up to about 40% by weight of the resin component, e.g., about 0.5 to about 20% by weight of the resin component.

In various preferred aspects of the invention, the film is prepared using a resin component, as described herein, which when tested in accordance with ASTM D1003 in the form of a 3.2 mm thick plaque possesses a light transmission value of higher than 88% (preferably higher than 90%) and/or exhibits an optical haze value of less than 10% (preferably less than 5%).

Film Characteristics

Films in accordance with the present invention are formulated and fabricated so as to have a light transmission of at least about 88% or at least about 90% and less than about 10% haze. In other advantageous embodiments, the film has a light transmission of at least 91%, at least 92% or even greater without having an anti-reflection coating. In additional embodiments, the film has less than 5% haze, less than 1% haze, less than 0.5% haze or less than 0.2% haze.

Stretched films, in particular bi-axially and/or uniaxially stretched films, may be prepared using the resin components of the present invention. Prior to being bi-axially stretched, the film may have, for example, a thickness of from about 60 to about 500 microns, for example. After being bi-axially stretched, the film may have a thickness of about 10 to about 200 microns or about 15 to about 80 microns, for example.

The optical films, in various embodiments of the invention, may possess a glass transition temperature of at least 105° C., at least 110° C., at least 115° C. or at least 120° C. or at least 125° C., as measured at a heating rate of 10° C./minute in DSC under $N_2$. The refractive index value of the film may be, in certain desirable embodiments of the invention, from 1.46 to 1.53 at a wavelength of 589 nm. The in-plane and out-of-plane retardation values in the films may be controlled preferably at or below 10 nm per equivalent 100 μm. The tensile strength and modulus of the optical films may respectively be above 70 MPa and 3 GPa while the tensile elongation may preferably be over 7%, more preferably over 10%. In certain embodiments of the invention, there is no obvious stress whitening of the optical film during the film lamination processes.

Methods of Making Films

In certain embodiments of the invention, the film is fabricated from the resin component (and, optionally, one or more additional components or additives) by an extrusion (melt casting) or solution casting method.

In a first step of an extrusion method for forming a film, the resin component described above may be supplied to an extruder such as a mini-cast film line, operating with set point temperatures, extruder screw speed, extruder die gap settings and extruder back pressure sufficient to convert the charged material from a solid (e.g. granular or pellet) state to a molten state. The extrusion process may typically be carried out at a temperature in the range of 240° C. to 280° C., preferentially under an inert gas such as nitrogen. The incorporation of one or antioxidants in the resin component may be advisable to avoid material degradation at higher processing temperatures.

The molten material is subsequently transferred e.g. by means of a gear pump to a film forming die, which can be any conventional film forming die, such as a "T-die" or a "coat hanger die", and extruded from the die onto a support. A film is then formed upon cooling by solidification of the cast material on the support, which is preferably made of a material capable of sustaining the temperature of the cast melt without deformation or deterioration by chemical reaction. The film may be stripped off from the support for further processing once solidification has progressed to the point that the film has self-supporting properties. In particular, the film may preferably be subjected to a subsequent film orientation treatment by mechanical stretching under the conditions set forth below. The mechanical stretching can be carried out before or after the completion of cooling in the film formation process.

Following extrusion or casting, the resulting film may be uniaxially or biaxially stretched. For example, the film may be subjected to a stretching step wherein the film may be stretched either uniaxially in machining or transverse direction or stretched biaxially in machining and transverse direction. In the case of the biaxial stretching, the film can be stretched in two directions simultaneously or sequentially, i.e. in machining direction followed by transverse direction, or vice versa. Orientation in a single direction (e.g. machine direction) yields a uniaxially oriented film. Similarly, orientation in two directions (e.g. machine direction and transverse direction), whether conducted simultaneously or as two separate steps, yields a biaxially oriented film.

Uniaxial or biaxial stretching can be carried out using a conventional tenter, e.g., a pin tenter, a clip tenter or a biaxial stretching tenter. If the film is on a support, the support must be sufficiently flexible to allow for effective stretching and has to sustain the mechanical stretching operation without rupture.

The stretching may, for example, be carried out at a temperature in the range of $T_g$-20° C. to $T_g$+40° C., e.g., in the range of $T_g$-10° C. to $T_g$+35° C., or in the range of $T_g$-5° C. to $T_g$+30° C., wherein $T_g$ refers to the glass transition temperature of the resin component used to make the film. The glass transition temperature is defined as 50% vitrification and 50% de-vitrification of an amorphous polymer.

The stretching ratio is defined as the ratio $L_s/L_0$, wherein $L_s$ represents the length of the film in the stretching direction after stretching and $L_0$ defines the length of the film in the stretching direction before stretching. The stretching ratio may preferably be in the range of from 1.05 times to 5.0 times, or from 1.1 times to 4.0 times, or from 1.25 times to 3.0 times.

The film stretching speed, which refers to the percentage elongation $(L_s-L_0)/L_0 \times 100\%$ in either machining direction or transverse direction per unit of time, may be, for example, from 0.01%/sec to 200%/sec, from 0.1%/sec to 100%/sec, or from 0.5%/sec to 50%/sec. When the stretching speed is too slow, the productivity is very low. When the stretching speed is too fast, it is easy to cause breakage of the film.

The stretching may be carried out in a single step or multiple steps, wherein the stretching conditions can be the same or different among the steps, but in any case fall within the range of conditions as specified above for each individual step. Each stretching step, may optionally further include a heat setting step wherein the stretched film is held under tension at a temperature in the range of, for example, near or above the glass transition temperature (Tg) of the resin component for a period of time in the range of, for example, from one second to three minutes.

In yet another embodiment, a film in accordance with the present invention may be produced by a solution casting or coating method. Such methods are especially useful for forming films which are relatively thin, i.e., films having a thickness less than that readily achievable through extrusion/biaxial stretching techniques. Any of the solution casting or coating methods known in the art may be adapted for use in the present invention. For example, the resin component may be dissolved in a suitable volatile solvent or combination of volatile solvents and the resulting solution applied as a layer to a surface of a suitable substrate. The applied layer may then be subjected to a drying step, wherein solvent is removed by an appropriate method such as heating and/or application of a vacuum. The resulting film may then be separated from the substrate (and optionally stretched, as described above) or left on the substrate, as may be appropriate for the particular desired end-product.

Film Uses

The films of the present invention can be used for the production of optical grade products for which a high degree of transparency is desirable and is maintained under mechanical stress within a wide temperature range.

Films of this invention, obtained by solution casting, melt casting or any other film formation process and irrespective of being "unoriented" or "oriented", may be further laminated to other optical films to form a composite film structure. Particular examples of those film structures include, but are not limited to, polarizing plates, positive and negative biaxial plates, positive and negative C-plates, and negative wavelength dispersion plates.

The films of the present invention are amorphous, highly transparent and of low haze, exhibiting adjustable birefringent/optical phase retardation properties, long-term durability, good mechanical stability and compatibility with other materials commonly used in manufacturing optical elements. They are thus considered as useful for optical compensation and for the production of optical elements for manipulation of the polarization state of light.

The films of the present invention may thus be utilized in a polarizing plate comprising a polarizer and two transparent protective films disposed on both sides thereof, wherein at least one of the protective films is a film according to the invention.

The polarizer may be, for example, an iodine-based polarizer, a dye-based polarizer using dichroic dye, or a polyene based polarizer. Iodine- and dye-based polarizers are typically produced from a PVA-based film, wherein the production process comprises doping a PVA-based film, uniaxial stretching the film, an optional fixing treatment, and drying. The PVA-based film is typically obtained by casting a solution or melt comprising a polymer that has been obtained by polymerization of vinyl ester monomers (possibly using other ethylenically unsaturated compounds as co-monomers) and subsequent saponification of the ester functions. Doping of the film may be carried out prior to uniaxial stretching, during it or thereafter. Doping may be achieved, for example, by immersing the PVA-based film in a solution comprising iodine-potassium iodide and/or dichroic dye(s), which are absorbed by the film or alternatively by blending these dopants during the stage of film casting. The uniaxial stretching may be conducted as a wet process, wherein the film is stretched in a warm or hot (30-90° C.) aqueous bath, which may be a solution comprising the above dopants, or as a dry process stretching the film in air or an inert gas atmosphere at a temperature in the range of, for example, from 50 to 180° C. The stretching ratio is typically at least 4.0 times. The mechanical stretching imparts a unidirectional orientation to the iodine-doped PVA-based film, which is responsible for the film's polarizing effect. Typically, the polarizer has a thickness in the range of from 100 to 250 μm, or from 100 to 160 μm, after stretching. In a fixation treatment, a crosslinking of the material the film is made of is carried out; this may, for example, be conducted by contacting the film with a boric acid solution. Drying of the polarizer is typically accomplished at a temperature in the range of, for example, from 30 to 150° C.

The polarizing plate may comprise transparent protective films other than the optical retardation films according to the present invention. These other transparent protective films are not particularly limited and may, for example, be cellulose acetate films such as TAC films, which are commercially available. The method by a film according to the present invention and/or the other transparent protective films can be applied to the polarizer to form the polarizing plate is not particularly limited. They may, for example, be directly laminated or stuck onto the polarizer.

Optionally, additional other functional films may be applied between the polarizer and one or both of the protective films or on top of one or both of the protective films, wherein one or both of the protective films can be a film according to the present invention. The other functional films may include, without being limiting, an anti-reflection film, a light scattering film, a transparent hard coat, an antistatic film, an adhesive film, a UV absorption film or a polarizing film.

If needed, an adhesive (in particular a pressure sensitive or hot melt adhesive) or a tie layer could be employed to facilitate bonding between any two of the previously mentioned films, i.e., the polarizer, a protective film (which could be a film of the present invention or a different type protective film), and one of the other functional films. In order to achieve a better adhesion during the film lamination, UV-curable urethane acrylic resins and their blends with multifunctional acrylic resins are preferable.

The inventive film or a polarizing plate comprising at least one film according to the invention may be used in a LCD display device. In one aspect, the present invention thus relates to a liquid crystal display or an imaging device comprising a film of the present invention as set forth above. Such a liquid crystal display typically comprises a liquid crystal cell and two polarizing plates, one disposed on each of the two sides of the liquid crystal cell, wherein at least one of the polarizing plates comprises at least one film according to the invention. For example, a film according to the invention may be used on the side of the polarizing plate facing the liquid crystal. Acrylic optical phase retardation films include zero-zero retardation films, C-plates, quarter-wavelength plates and half-wavelength plates.

Other suitable end-uses for films in accordance with the present invention include, but are not limited to, DVD production, insert molding, use as an outer layer in a flat panel display or LED, membrane switches, decals or transfer films, instrument panels and smart cards. In one embodiment, graphic designs may be printed onto a film in accordance with the invention and the printed film applied to a substrate. A film in accordance with the invention can be applied to a surface of a substrate by lamination or the use of an adhesive or tie layer, for example. Films containing an acid-functionalized acrylic polymer, such as the copolymer present in the resin component used to prepare films in accordance with the present invention, can provide better adhesion to a PVA layer.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable composition or process. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Testing Methods:

Melt flow rate (MFR) measurement: Instron Ceast MF30 equipment was used for polymers in melt flow rate measurements. The die temperature was controlled at 230° C. while the loading cell weight was at 3.8 kg. The dried pellets were used near 20° C. below the $T_g$ over 8 hours.

Gel permeation chromatography (GPC): Waters Alliance 2695 and Waters Differential Refractometer 2410 were used to make polymer molecular weight measurements. Columns were based on two PL Gel mixed C columns and a guard column (7.8 mm I.D.×30 cm, 5 µm). THF (HPLC grade) was selected as a solvent. Temperature was controlled at 35° C. Ten poly(methyl methacrylate) standards were used in the calibration, ranging in $M_p$ (peak molecular weight) from 550 to 1,677,000 g/mole.

Differential scanning calorimetry (DSC): The glass transition temperatures of acrylic polymers were measured at a heating rate of 10° C./minutes in $N_2$ using TA instruments Q2000 DSC, during the second heating. The first heating was used to heat the sample to 170° C. at a heating rate of 10° C./minute, then, the sample was cooled down to 0° C. at a cooling rate of 10° C./minute. The sample weight was controlled at 5-10 mg.

Thermogravimetry (TGA): The thermal decomposition temperatures of acrylic polymers were measured at a heating rate of 10° C./minute in $N_2$ using TA instruments Q5000 TGA. The sample weight was controlled at 5-10 mg. The samples were pre-dried under a vacuum oven at 100° C. overnight. Isothermal TGA measurements were operated at a heating rate of 10-50° C. per minute using TA instruments Q5000 TGA to reach a selected isothermal temperature such as 270° C. in $N_2$ or air for a certain period of time such as 30 to 60 minutes.

Total light transmission: The total light transmission was measured from film and/or plaque samples in a transmission mode using Perkin Elmer Lambda 950 with a 150 mm integrating sphere. The selected UV/Vis wavelength range was from 200 nm to 800 nm in UV/Vis region.

Haze: Optical haze of clear film and/or plaque samples was measured using BYK HazeGard Plus.

Tensile strength and elongation: The tensile strength, modulus and elongation of the tensile bars was evaluated using Instron Model 4202 at the crosshead speed of 5 mm/minute. The tensile was at 6" in length while the width was at 0.50". The sample thickness was at 0.125".

Bi-axial stretching: Film samples 4"×4" to 6"×6" in size were stretched using a Bruckner at a speed of 0.05% per second to 50% per second. The bi-axial stretching temperature used was near the glass transition temperature (Tg−20° C. to Tg+35° C.). The film thickness was controlled at 100-500 µm.

In-plane and out-of plane retardation: The in-plane retardation from optical film was measured at a selected wavelength of 560 nm or the whole visible wavelength using an ellipsometer (J. A. Woollam Co. Inc.) in a transmission while the out-of-plane retardation was obtained at a selected wavelength of 560 nm or the whole visible wavelength.

Example 1

30 kg of pMMA-EA (97/3) copolymer (a copolymer of 97 wt. % methyl methacrylate and 3 wt. % ethyl acrylate having a weight average molecular weight of 145,000-150,000 g/mole) was compounded into 70 kg of pMMA-MAA (95/5) copolymer (a copolymer of 95 wt. % methyl methacrylate and 5 wt. % acrylic acid having a weight average molecular weight of 75,000-80,000 g/mole) using a twin-screw extruder with a venting system at the die temperature and barrel temperature of 230° C. and 260° C. respectively, using a speed of 25 kg/hour. The anti-oxidants (150 g of Irganox® primary antioxidant and 75 g of Irgafos® secondary antioxidant) were added into the formulation during the compounding through the drum blending. The melt streams went through a water bath before the pelletization. Melt flow rate (MFR) of the resulting resin composition was measured as 1.5 g/10 minutes at the temperature 230° C. under 3.8 kg. The glass transition temperature of the resin composition was measured as 120° C. in $N_2$ using DSC at a heating rate of 10° C./minute. The weight average molecular weight Mw of the resin was measured to be 92,500 g/mole using GPC along with a Mw/Mn (polydispersity) value of 2.2. The tensile modulus of this testing sample was measured at 3.3 GPa while the tensile strength was at 75 MPa, along with a tensile elongation of 9%.

An optical film was extruded from the resin composition using a high temperature film extrusion line along with a venting system installed on the production line. The film thickness was controlled in the range of 125 µm. Before the film extrusion, the resin composition was dried at 102° C. in a desiccator oven for 8 hours. A uniform film was obtained at a line speed of 10 feet per minute. The light transmission was measured as 92.4% at 560 nm using Lambda 950 while the haze was measured as 0.1% using a hazemeter (using Haze Gard Plus from BYK).

Simultaneously bi-axial stretching film processes were conducted using a film size of 4 inches by 4 inches and a Bruckner stretcher at 145° C.; before the bi-axial stretching, the film thickness was 125 µm. After the biaxial stretching, the film optical film thickness was 41 µm. The light transmission was measured as 92.3% at 560 nm using Lambda 950 while the haze was measured as 0.3%. The effective retardation was measured at a function of the incident angles from 0, 15, 30, 45 and 60 degrees using an ellipsometer (J. A. Woollam Co. Inc.). The in-plane retardation was measured as 0.6 nm at 560 nm while the out-of-plane retardation was obtained at 4.1 nm at 560 nm.

Example 2

50 kg of pMMA-EA (97/3) copolymer (a copolymer of 97 wt. % methyl methacrylate and 3 wt. % ethyl acrylate, having a weight average molecular weight, Mw, of 145,000-150,000 g/mole) was compounded into 50 kg of pMMA-MAA (95/5) copolymer (a copolymer of 95 wt. % methyl methacrylate and 5 wt. % methacrylic acid having an Mw of 75,000-80,000 g/mole) using a twin-screw extruder with a venting system at the die temperature and barrel temperature of 230° C. and 260° C., along with a speed of 25 kg/hour. The anti-oxidants (150 g of Irganox® primary antioxidant and 75 g of Irgafos® secondary antioxidant) were added into the formulation during the compounding through the drum blending. The melt streams went through a water bath before the pelletization. Melt flow rate (MFR) of the resulting resin composition was measured as 1.1 g/10 minutes at a temperature of 230° C. under 3.8 kg. The glass transition temperature of the resin was measured as 118° C. in $N_2$ using DSC at a heating rate of 10° C./minute. The weight average molecular weight Mw of the resin was measured to be 103,000 g/mole using GPC along with a Mw/Mn (polydispersity) value of 2.2. The tensile modulus of this testing sample was measured at 3.2 GPa while the tensile strength was at 75 MPa, along with a tensile elongation of 10%.

The optical film was extruded using a high temperature film extrusion line along with a venting system installed on the production line. The film thickness was controlled in the range of 155 µm. Before the film extrusion, the resin was dried at 102° C. in a desiccator oven for 8 hours. The uniform film was extruded at the line speed of 10 feet per minute. The light transmission was measured as 92.4% at 560 nm using Lambda 950 while the haze was measured as 0.1% using a hazemeter (Haze Gard Plus).

Simultaneously bi-axial stretching film processes were conducted at a film size of 4 inches by 4 inches using a Bruckner stretcher at 138° C.; before the bi-axial stretching, the film thickness was 150 µm. After the biaxial stretching, the film optical film thickness was 41 µm. The light transmission was measured as 92.3% at 560 nm using Lambda 950 while the haze was measured as 0.3%. The in-plane retardation was measured as 0.5 nm at 560 nm using an ellipsometer (J. A. Woollam Co. Inc.) while the out-of-plane retardation obtained was 4.0 nm at 560 nm.

Example 3

70 kg of pMMA-EA (97/3) copolymer (a copolymer of 97 wt. % methyl methacrylate and 3 wt. % ethyl acrylate, having a weight average molecular weight Mw of 145,000-150,000 g/mole) was compounded into 30 kg of pMMA-MAA (95/5) copolymer (a copolymer of 95 wt. % methyl methacrylate and 5 wt. % methacrylic acid, having an Mw of 75,000-80,000 g/mole) using a twin-screw extruder with a venting system at the die temperature and barrel temperature of 230° C. and 260° C., along with a speed of 25 kg/hour. The anti-oxidants (100 g of Irganox® primary antioxidant and 50 g of Irgafos® secondary antioxidant) were added into the formulation during the compounding through the drum blending. The melt streams went through a water bath before the pelletization. Melt flow rate (MFR) of the resulting resin was measured as 0.9 g/10 minutes at a temperature of 230° C. under 3.8 kg. The glass transition temperature of the resin composition was measured as 115° C. in $N_2$ using DSC at a heating rate of 10° C./minute. The weight average molecular weight Mw of the resin was measured to be 121,000 g/mole using GPC along with a Mw/Mn (polydispersity) value of 2.2. The tensile modulus of this testing sample was measured at 3.2 GPa while the tensile strength was at 73 MPa, along with a tensile elongation of 11%.

An optical film was extruded using a high temperature film extrusion line along with a venting system installed on the production line. The film thickness was controlled in the range of 154 µm. Before the film extrusion, the resin composition was dried at 100° C. in a desiccator oven for 8 hours. The uniform film was extruded at a line speed of 10 feet per minute. The light transmission was measured as 92.3% at 560 nm using Lambda 950 while the haze was measured at 0.1% from a hazemeter (using Haze Gard Plus).

Simultaneously bi-axial stretching film processes were conducted at a film size of 4 inches by 4 inches using a Bruckner stretcher at 135° C.; before the bi-axial stretching, the film thickness was 150 µm. After the biaxial stretching, the film optical film thickness was 39 µm. The light transmission was measured as 92.3% at 560 nm using Lambda 950 while the haze was measured as 0.3%. The in-plane retardation was measured as 0.5 nm at 560 nm using an ellipsometer (J. A. Woollam Co. Inc.) while the out-of-plane retardation was 3.6 nm at 560 nm.

Example 4

100 kg of pMMA-MAA (97/3) copolymer (a copolymer of 97 wt. % methyl methacrylate and 3 wt. % ethyl acrylate, having a weight average molecular weight Mw of 121,000 g/mole, along with an Mw/Mn value of 2.1) was compounded with anti-oxidants (150 g of Irganox® primary antioxidant and 75 g of Irgafos® secondary antioxidant) at high temperature. The compounding was conducted using a twin-screw extruder with a venting system at a die temperature and a barrel temperature of 230° C. and 265° C., respectively, at a speed of 25 kg/hour. The melt streams went through a water bath before pelletization. Melt flow rate (MFR) of the resulting resin was measured as 0.8 g/10 minutes at a temperature of 230° C. under 3.8 kg. The glass transition temperature of the resin composition was measured as 121° C. in $N_2$ using DSC at a heating rate of 10° C./minute. The tensile modulus of this testing sample was measured at 3.2 GPa while the tensile strength was 74 MPa, along with a tensile elongation of 12%.

An optical film was extruded using a high temperature film extrusion line at a die temperature of 265° C., along with a venting system installed on the production line. The thickness was controlled in the range of 156 µm. Before the film extrusion, the resin composition was dried at 102° C. in a desiccator oven for 8 hours. The uniform film was extruded at a line speed of 15 feet per minute. The light transmission was measured as 92.3% at 560 nm using Lambda 950 while the haze was measured at 0.1% using a hazemeter (Haze Gard Plus). Simultaneously bi-axial stretching film processes were conducted at a film size of 4 inches by 4 inches using a Bruckner stretcher at 151° C.; before the bi-axial stretching, the film thickness was 150 µm. After the biaxial stretching, the optical film thickness was 41 µm. The light transmission was measured as 92.3% at 560 nm using Lambda 950 while the haze was measured as 0.3%. The in-plane retardation was measured as 1.2 nm at 560 nm using an ellipsometer (J. A. Woollam Co. Inc.) while the out-of-plane retardation was 4.0 nm at 560 nm.

What is claimed is:

1. A film comprising a resin component having a Tg of at least about 115° C. and a weight average molecular weight of at least about 90,000 g/mole but not more than 250,000 g/mole, the resin component comprising:
   a) at least one copolymer of methyl methacrylate, methacrylic acid and, optionally, at least one additional co-monomer, wherein the at least one copolymer comprises about 94 to about 98.5% by weight methyl methacrylate and has a weight average molecular weight of 70,000 to 80,000 g/mole, and
   b) at least one additional polymer selected from the group consisting of a copolymer of methyl methacrylate and methyl acrylate or ethyl acrylate, and, optionally, at least one additional co-monomer selected from a vinyl aromatic monomer, cyclic and aliphatic unsaturated anhydrides and cyclohexyl methacrylate, wherein the at least one additional polymer has a weight average molecular weight of at least 120,000 g/mole and wherein the copolymer comprises 80 to 99% by weight methyl methacrylate,
   wherein the film has a light transmission of at least about 90% and less than about 1% haze, and
   wherein the resin component additionally comprises at least one antioxidant selected from the group consisting of phosphite antioxidants, phosphate antioxidants, phosphonate antioxidants, phosphine antioxidants, phenolic antioxidants, triazinetrione antioxidants and combinations thereof.

2. The film of claim 1, wherein at least one additional co-monomer is present in the copolymer.

3. The film of claim 1, wherein the at least one copolymer is selected from the group consisting of methyl methacrylate/methacrylic acid copolymers, methyl methacrylate/methacrylic acid/ethyl acrylate copolymers, methyl methacrylate/methacrylic acid/methyl acrylate copolymers, methyl methacrylate/methacrylic acid/tert-butyl cyclohexyl methacrylate copolymers, methyl methacrylate/methacrylic acid/styrene copolymers, methyl methacrylate/methacrylic acid/styrene/maleic anhydride copolymers, methyl methacrylate/methacrylic acid/maleic anhydride/alpha-methyl styrene copolymers, methyl methacrylate/methacrylic acid/tert-butyl cyclohexyl methacrylate/benzyl methacrylate copolymers, methyl methacrylate/methacrylic acid/ethyl acrylate/tert-butyl cyclohexyl methacrylate copolymers, methyl methacrylate/methacrylic acid/tert-butyl cyclohexyl methacrylate/tert-butyl methacrylate copolymers and combinations thereof.

4. The film of claim 1, wherein methacrylic acid comprises from about 1.5 to about 8 weight % of the copolymer.

5. The film of claim 1, wherein the Tg of the resin component is not greater than about 140° C.

6. The film of claim 1, wherein the film has been biaxially stretched.

7. The film of claim 6, wherein the film has a thickness of about 10 to about 200 microns.

8. The film of claim 6, wherein the film has a thickness of about 15 to about 80 microns.

9. The film of claim 1, wherein the film has a thickness of about 60 to about 500 microns.

10. The film of claim 1, wherein the film has an in-plane retardation value of less than about 20 nm at a wavelength of 560 nm and an out-of-plane retardation value of less than about 20 nm at a wavelength of 560 nm.

11. The film of claim 1, wherein the weight average molecular weight of the resin component is at least about 100,000 g/mole.

12. The film of claim 1, wherein the film has a light transmission of at least about 92% and less than 0.5% haze.

13. The film of claim 1, wherein the resin component has a melt flow rate of about 0.5 to about 2.0 g/10 minutes at 230° C. under 3.8 kg.

14. The film of claim 1, additionally comprising at least one UV stabilizer selected from the group consisting of benzophenone UV stabilizers, benzotriazole UV stabilizers, hydroxyphenyl benzotriazole UV stabilizers, hydroxyphenyl triazine UV stabilizers, benzoxazinone UV stabilizers and combinations thereof.

15. The film of claim 1, additionally comprising at least one toughening agent.

16. The film of claim 1, wherein the resin component contains 0.5 to 2% by weight anhydride ring structures, as measured by $^{13}C$ NMR.

17. A method of making the film of claim 1, comprising melt-extruding the resin component to form the film.

18. The method of claim 17, comprising an additional step of bi-axially stretching the film.

19. A laminate comprising at least one film in accordance with claim 1 and at least one substrate or film other than a film in accordance with claim 1.

20. A liquid crystal display (LCD) or OLED device comprising at least one film in accordance with claim 1.

21. An article comprising at least one film in accordance with claim 1, wherein the article is selected from the group consisting of reflective films, multilayer films, conspicuity films, decoration films, Ag coated mirrored films, lenticular films, identification cards, appliances, transportation vehicles, solar films, and dual brightness enhancement films.

* * * * *